United States Patent [19]

Banks et al.

[11] Patent Number: 5,180,121
[45] Date of Patent: Jan. 19, 1993

[54] AIRCRAFT DOOR HINGE MECHANISM WITH SELECTIVELY TRIGGERABLE ACTUATOR

[75] Inventors: Eddie D. Banks, Renton; Tomio Hamatani, Seattle; Chung-Wah F. Wong, Bellevue, all of Wash.

[73] Assignee: The Boeing Company, Seattle, Wash.

[21] Appl. No.: 696,245

[22] Filed: May 6, 1991

[51] Int. Cl.⁵ ................................................ B64C 1/14
[52] U.S. Cl. ................................. 244/129.5; 49/237; 16/317
[58] Field of Search .............. 244/129.5; 49/386, 237, 49/238, 239, 334, 324, 360; 16/313, 312, 235, 317; 296/146; 200/61.62

[56] References Cited

U.S. PATENT DOCUMENTS

| | | | |
|---|---|---|---|
| 2,308,057 | 1/1943 | Cooley | 49/334 |
| 2,338,965 | 1/1944 | Parsons | 49/334 |
| 3,056,386 | 10/1962 | Aarvold et al. | 121/119 |
| 3,213,923 | 10/1965 | Richter | 49/334 |
| 3,222,806 | 12/1965 | Martin | 49/237 |
| 3,301,313 | 1/1967 | Schurink | 49/334 |
| 4,447,026 | 5/1984 | Maraghe | 244/129.5 |
| 4,458,448 | 7/1984 | Proulx | 49/237 |
| 4,490,941 | 1/1985 | Mamach | 49/334 |
| 4,503,637 | 3/1985 | Parente | 49/360 X |
| 4,589,613 | 5/1986 | Opsahl | 244/129.5 |
| 4,697,306 | 10/1987 | Rhodes | 16/317 |
| 4,731,886 | 3/1988 | Heinrich et al. | 49/334 |
| 4,838,102 | 6/1989 | Bode et al. | 49/334 |
| 5,050,344 | 9/1991 | Skeem | 49/237 |

Primary Examiner—Charles A. Marmor
Assistant Examiner—Carla Mattix
Attorney, Agent, or Firm—Christensen, O'Connor, Johnson & Kindness

[57] ABSTRACT

A cam actuator (12) for rapidly opening an aircraft door (14) that is attached to an aircraft fuselage (18) by a hinge assembly (26). The actuator includes a piston (40), a piston rod (42) that is secured to the piston and rotating sleeve (44) that is fitted over the piston rod that functions as the hinge pin between a hinge clevis (26) on the aircraft and a hinge arm lug (54) on the hinge assembly. The piston is contained within a housing (38) adapted to receive a pressurized pneumatic gas. An annular cam (50) through which the piston rod travels and that is formed with an outer surface (104) having a helical profile is attached to the hinge clevis. A cam follower (46) is attached for the sleeve so as to rotate in unison therewith. The hinge arm lug (54) is also secured to the sleeve (44) for rotation. When the actuator of this invention is triggered, the piston rod (42) urges the cam follower (46) against the cam (50) so as to cause the cam follower to rotate. The cam follower (46) in turn rotates the sleeve (44) so as to simultaneously rotate the hinge arm lug (54). As a result of this rotation, the hinge is pivoted away from the hinge clevis so as to urge the aircraft door open.

22 Claims, 5 Drawing Sheets

AIRCRAFT DOOR HINGE MECHANISM WITH SELECTIVELY TRIGGERABLE ACTUATOR

FIELD OF THE INVENTION

This invention relates to aircraft door assemblies, and, more particularly, to a cam-driven actuator for rapidly opening an aircraft door.

BACKGROUND OF THE INVENTION

An integral part of any aircraft fuselage is the door assembly through which passengers and crew enter and exit the aircraft. The door assemblies of modern commercial aircraft are designed to stay sealed regardless of the large pressure differential between the interior of the fuselage and the outside environment when the aircraft is in flight at high altitudes. This necessitates providing the door assemblies with relatively heavy locking mechanisms in order to make sure the integrity of the seals is maintained. Moreover, most commercial aircraft door assemblies are provided with an emergency escape chute that can be quickly inflated in the event a rapid evacuation of the aircraft is required. The escape chute further adds to the weight of these door assemblies. Consequently, it is not uncommon for an aircraft door of a modern commercial airliner to weigh 400 pounds or more. Most of these doors are provided with latch mechanisms that employ human energy to first break the door seal and then move the door free of the fuselage opening in which it is disposed. In normal circumstances, flight attendants or ground personnel need only exert themselves for several seconds in order to place a door in the open position.

However, there are instances wherein even the few seconds it regularly takes to open an aircraft door may be too long. These instances are when there is an event, such as cabin fire, that requires all those in the aircraft to leave rapidly for their own safety. It is during these events that it is necessary to deploy the escape chute in order to insure that persons can safely evacuate the airplane even if it is not located near a jetway or a set of boarding stairs. Consequently, both safety considerations and regulatory requirements demand that in emergency situations aircraft doors open rapidly, and the associated escape chutes quickly inflate so that persons can evacuate the aircraft without delay.

As a result of these requirement, the door assemblies of many commercial aircraft are provided with emergency actuators for rapidly moving them free of the aircraft openings to which they are attached. One type of actuator is a gas-driven piston which is linked to a rotating hinge pin to which the door hinge is attached. When the actuator is triggered, the piston moves so as to cause the hinge pin to rotate. Since the hinge is attached to the hinge pin, the rotation of the pin causes the hinge to pivot so as to force the door open. These actuators have proved to be well suited mechanisms for rapidly opening aircraft doors.

Nevertheless, existing actuators have a disadvantage in they necessitate special design considerations for aircraft in which they are installed. These actuators tend to impose relatively large lateral forces on the hinge pins to which they are linked. Consequently, the hinge assemblies must be designed so that they can withstand these forces when the associated actuators are triggered. Similarly, the piston movement imposes an intense mechanical shock on its housing. This necessitates having to securely brace the housing to the fuselage in order to be sure it remains secured when the actuator is triggered. The reinforcing bracing required for the hinge assembly and the actuator housing add to both the weight and the cost of the aircraft. Moreover, the actuators, in combination with the linkage mechanisms used to connect them to the door hinge pins, occupy a significant amount of space. Consequently, installing these actuators in the vicinity of aircraft door assemblies, where it is already necessary to provide a number of different components in a limited amount of space, has proved to be a difficult task.

SUMMARY OF THE INVENTION

This invention relates generally to an aircraft door actuator for rapidly moving an aircraft door away from the fuselage opening to which the door is attached. More particularly, this invention is directed to an aircraft door actuator that includes a piston assembly that functions as the hinge pin of the door assembly with which it is used. When the actuator of this invention is triggered, the piston is forced to rotate so as to cause the hinge to pivot and the aircraft door to open.

The actuator of this invention includes a housing that partially contains a piston and piston rod assembly. In one preferred embodiment of the invention, a rotating sleeve is disposed over the exposed portion of the piston rod and functions as the rotating pin of an aircraft door hinge assembly. At least one cam follower with a pair of diametrically opposed bearing elements is secured to the sleeve so as to move longitudinally along the sleeve and rotate in unison with the sleeve. The cam follower bearing elements each abut the outer surface of separate, stationary cams that are fixed to a hinge clevis that is attached to adjacent section of the aircraft fuselage. Each of the cam outer surfaces have a helical profile and the cams are arranged so that the outer surfaces are reverse symmetric from each other. The aircraft door hinge is fixedly attached to the sleeve. A small storage tank coupled to the aircraft door contains a supply of pneumatic gas that is capable of moving the piston.

During the normal use of the aircraft door, the sleeve rotates as the hinge is pivoted during the regular opening and closing of the aircraft door. When the actuator of this invention is triggered, a valve integral with the gas storage tank is opened to allow the pneumatic gas to flow into the housing. The gas causes the piston and the piston rod to move downwards. During this movement, the cam follower is moved downward and the bearing elements are urged against the helical outer surface of the cams. The stationary cams cause the cam follower and the sleeve to rotate. The rotation of the sleeve, in turn, causes the door hinge to pivot and swing the door open.

The only forces imposed on the hinge and associated clevis by the actuator of this invention are the angular forces that open the door. Since the cam followers are diametrically opposed, the forces on the cams are self-canceling. Thus, neither the sleeve, the piston rod, the hinge, or the hinge clevis is exposed to any lateral stress that require them to be provided with special reinforcing members. Similarly, the actuator housing is only subjected to a limited amount of vertical shock when the piston moves downward. Consequently, the housing does not have to be secured to the door with bracing adequate to withstand intense mechanical shock. Thus, the actuator of this invention can be attached to an aircraft door assembly without having to provide significant reinforcing bracing that adds to both the weight and cost of the aircraft.

Furthermore, the actuator occupies only a small amount of space. This feature, in combination with the fact that actuator does not require significant reinforcing bracing, makes it a relatively easy task to secure the actuator to an aircraft door that may already be provided with numerous other components.

Moreover, the actuator of this invention is integrally connected to the hinge with which it is used. There is no intermediate linkage to connect these two subassemblies of the door assembly together. In other words, the actuator of this invention has relatively few components so that it is light in weight, relatively economical to manufacture and simple to maintain.

BRIEF DESCRIPTION OF THE DRAWINGS

The invention is pointed out with particularity in the claims. The above and further advantages of this invention may be better understood by referring to the following description taken in conjunction with the accompanying drawings, in which:

DETAILED DESCRIPTION OF THE INVENTION

Figure 1:
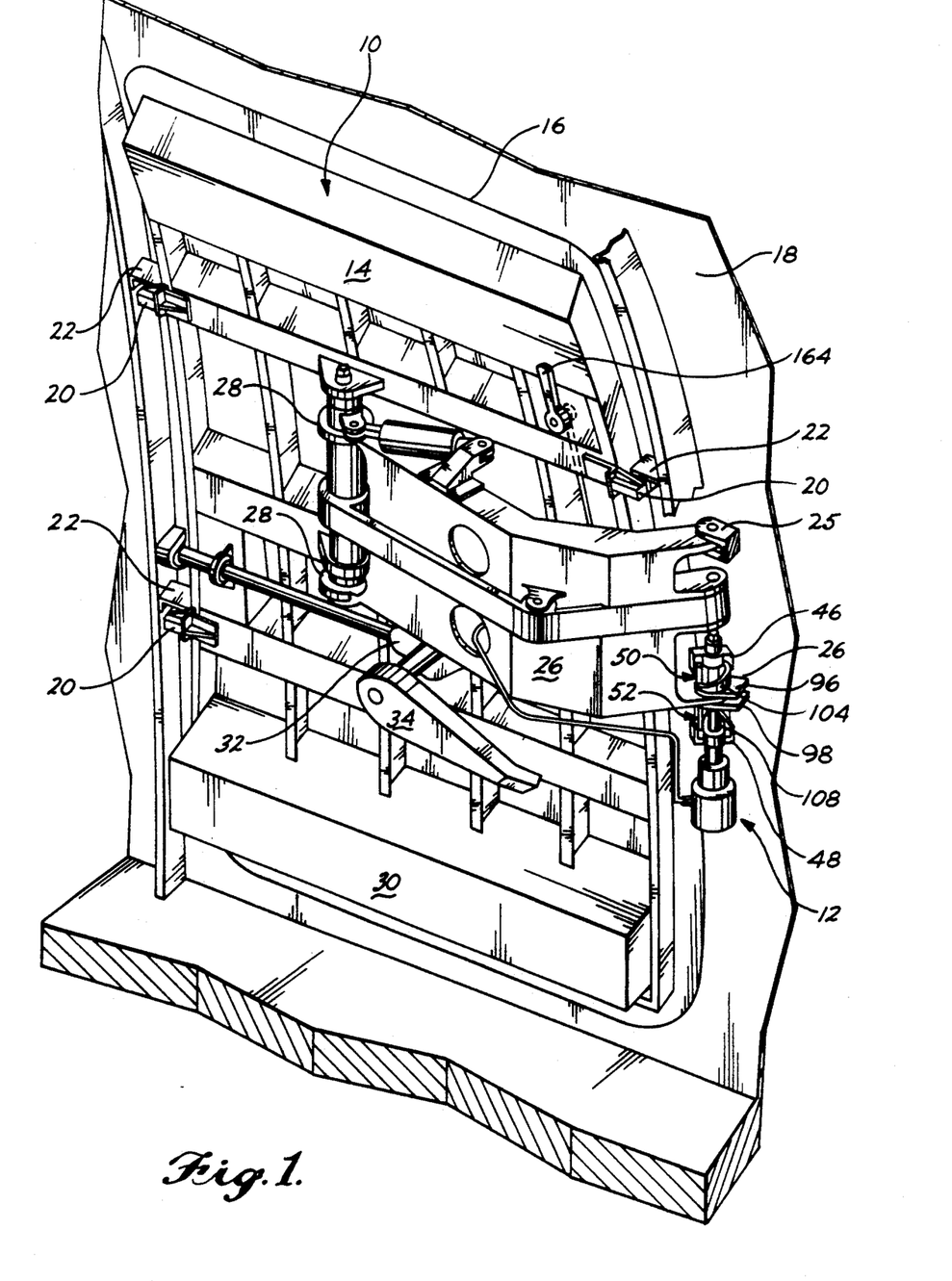
FIG. 1 is a perspective view showing an aircraft door assembly in which the cam-driven actuator of this invention is employed.

FIG. 1 is a perspective view of an aircraft door assembly 10 with which a cam-driven actuator 12 of this invention is employed. The door assembly 10 includes a door 14 mounted in an opening 16 formed in the side of an aircraft fuselage 18. The sides of the door 14 are provided with a number of outwardly extending door stops 20. In a conventional manner, the door 14 is closed, the door stops abut complementary fuselage stops 22 that are mounted to the fuselage 18 around the door opening 16. When the aircraft is in flight, high cabin pressure inside the aircraft, in comparison to the lower atmospheric pressure, urges the door 14 outwards so that the door stops 20 abut against the fuselage stops 22 and seal the door shut. A hinge 24 that is pivotally attached at one end to a set of upper and lower hinge clevises, 25 and 26, integral with the fuselage 18, and at the opposite end to a set of door clevises 28 integral with door 14, attaches the door to the fuselage so as to allow it to move between the opened and closed positions, (hinge clevis-to-fuselage interface not shown in this FIG.). A bustle 30 that contains an inflatable escape chute, not shown, is attached to the base of the door 14.

The opening and closing of the door 14 is controlled by a lift latch mechanism 32. When the door 14 is closed, the lift latch mechanism 32 controls the travel of the door so that initially the door stops 20 pass over the fuselage stops 22. After the door stops 20 clear the fuselage stops 22, the lift latch mechanism 32 lowers the door 14 so that the door stops drop behind and abut the fuselage stops. When the door 14 is opened, the lift latch mechanism 32 first lifts the door upwards so that door stops 20 clear the frame stops 24 so that the door can then be moved outwards. The lift latch mechanism 32 is controlled by a lever 34 that is pivotally attached to the mechanism. A more detailed description of how one type of lift latch mechanism 32 operates can be found in U.S. Pat. No. 4,720,065 to Hamatani for a Translatable Outward Opening Plug-Type Aircraft Door And Actuating Mechanisms Therefor which is owned by the assignee of this application and is incorporated herein by reference.

Figure 2:
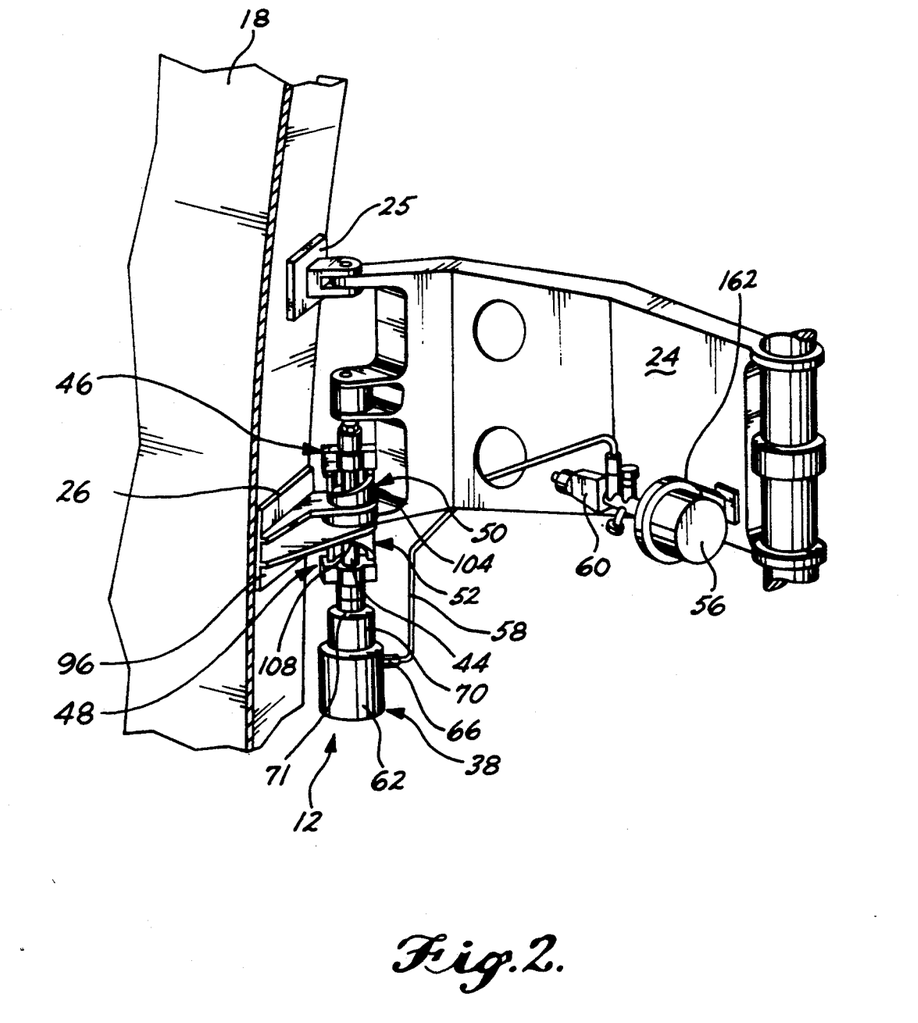
FIG. 2 is a perspective view showing the cam-driven actuator FIG. 1 in detail.
Figure 3:
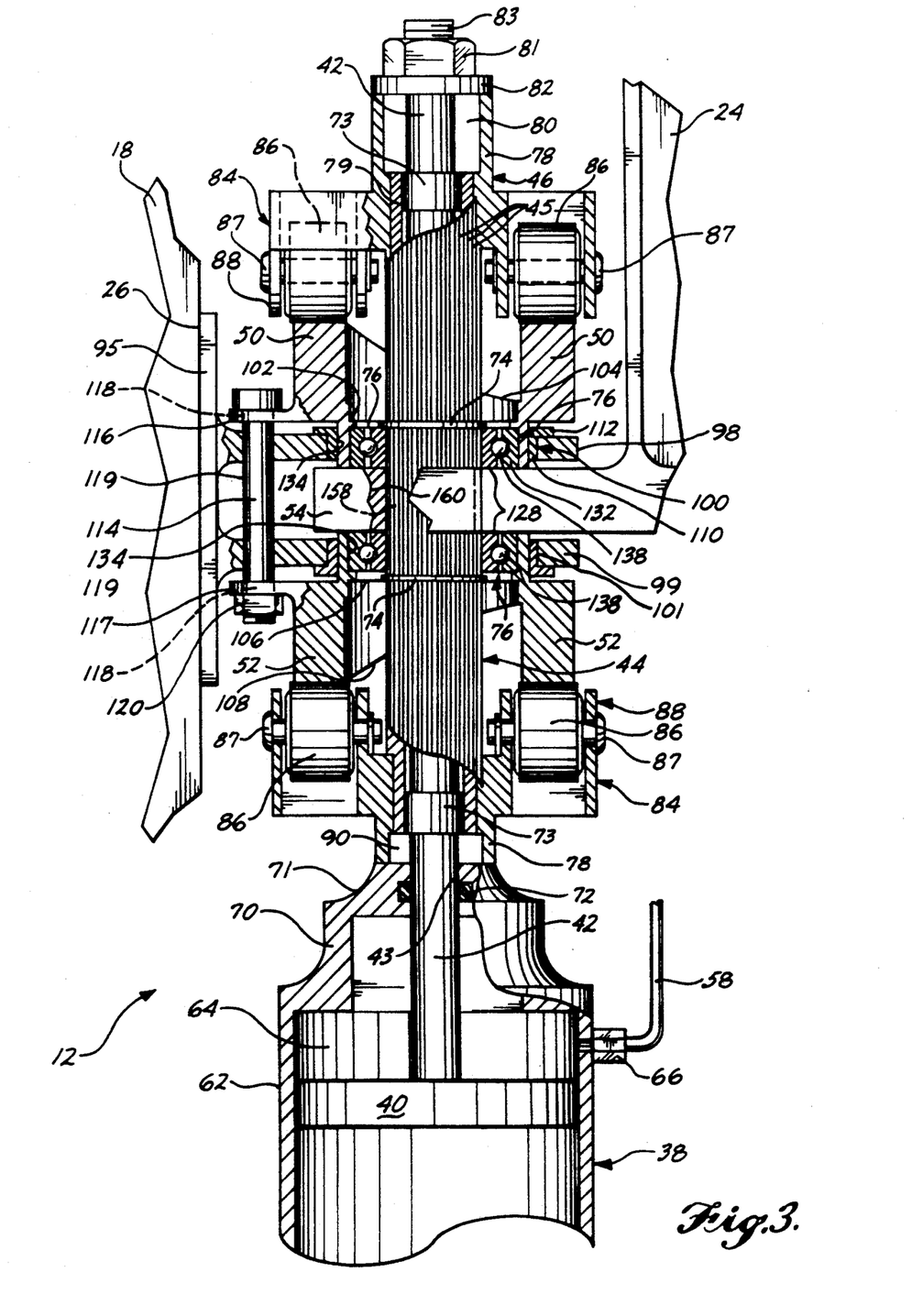
FIG. 3 is a front and partial cross-sectional view illustrating the actuator of FIGS. 1 and 2.

The cam-driven actuator 12 of this invention, as depicted in FIGS. 2 and 3, includes a piston housing 38 that is suspended from the lower hinge clevis 26. A piston 40 is disposed in the housing 38 and has a piston rod 42 integral therewith that extends out through an opening 43 formed in the top of the housing and through openings described hereinafter in the hinge clevis 26. A sleeve 44 formed with a splined outer surface 45 is fitted over the exposed portion of the piston rod 42. A first, downward-directed cam follower 48 is attached to the top end of the sleeve 44. A second, upward-directed cam follower 48 is attached to the opposite end of the sleeve 44 adjacent the piston housing opening 43. The first cam follower 46 abuts a pair of upward-directed cams 50 integral with the hinge clevis 26. The second cam follower 48 abuts a pair of downward-directed cams 52 also integral with the hinge clevis 26. The hinge 24 is attached to the actuator 12 by a hinge arm lug 54, integral with the hinge, that is fitted over the sleeve 44 between the cam pairs 50 and 52. Pneumatic gas for driving the piston 40 is stored in a gas tank 56 attached to the hinge 24. The gas, which is under pressure, is introduced into piston housing 38 through a line 58 connected between the gas tank 56 and the housing. Gas flow is controlled by a normally closed valve 60 attached to the head of the tank 56.

The piston housing 38 includes a main body 62 that defines a cavity 64 in which the piston 40 is disposed. The housing main body 62 is provided with a pneumatic input port 66 above the piston 40 through which pneumatic gas from gas line 58 is introduced into the cavity 64 above the piston 40. The piston housing 38 is also formed with a neck section 70 that is integral and above the main body 62. The top of the piston housing neck 70 is formed with a cap 71 with a concaved curvature and that defines the piston rod opening 43. A seal 72 is fitted inside the piston housing neck cap around the piston rod 42 to prevent the escape of pneumatic gas from the housing 38.

The splined sleeve 44 has an inside diameter that is slightly greater than the outside diameter of the piston rod 42. The splined sleeve 44 is held in place over the piston rod 42 and centered over the piston rod by a pair of bushings 73 located inside each end of the sleeve. The splined sleeve 44 is smaller in length than the piston rod 42. A pair of snap rings 74 that are fitted into complementary grooves, not shown, in the sleeve 44 hold the sleeve in place so that it is spaced away from both the piston housing opening 43 and the free end of the piston rod 42. The exposed sections of the snap rings 74 each abut separate bearing assemblies 76 that are associated with the cam pairs 50 and 52.

The first cam follower 46 includes a follower fitting 78 that is mated to the free end of the splined sleeve 44 and extends around the section of the piston rod 42 that extends beyond the sleeve. The follower fitting 78 is tubular in shape and has an inner wall formed with lateral ridging 79 that is complementary with the sleeve outer surface 45 so that the cam follower 46 will rotate with the sleeve 44. The inside surface of the follower fitting 78 is lubricated so that the fitting can freely travel longitudinally along the sleeve outer surface 45. A nut 81 and a washer 82 are secured to the free end of the piston rod 42 which is formed with a complementary threaded surface 83 above the first cam follower fitting 78 so as to secure the other components of the actuator 12 to the first cam follower 46. The follower fitting 78 extends above the splined sleeve 44 so as to define an annular space 80 around the piston rod 42 between the sleeve and the washer 82. A roller bar 84 which extends out over the first pair of cams 50 is integrally attached to the follower fitting 78. A pair of roller bearings 86 are mounted to the roller bar 84 such that the bearings abut the topmost section of the cams 50. Each roller bearing 86 is mounted to the roller bar 84 by by a pin 87 that extends through the bearing and a pair of tabs 88 integrally formed with the the roller bar. The tabs 88 are dimensioned so that the roller bearings 86 extend a sufficient distance away from the roller bar 84 so that roller bearings contact the cams 50 when the actuator 12 is triggered.

The second cam follower 48 is an inverted version of the first cam follower 46 and includes the same elements. The open end of the follower fitting 78 of the second cam follower 48 rests on portions of the piston rod housing cap 71 that define the piston rod opening 43. The end of the second cam follower follower fitting 48 to which the roller bar 84 is attached is fitted into the adjacent end of the splined sleeve 44. The lateral ridging along the inside of the follower fitting 78 interlocks with the sleeve outer surface 45 so that the cam follower 48 rotates with the sleeve 44. The follower fitting 78 is also lubricated so that the fitting can travel longitudinally along the sleeve outer surface 45. Since the sleeve 44 is spaced away from the piston housing cap 71, there is a gap 90 around the section of the piston rod 42 that extends out immediately adjacent to the piston housing 38. The second cam follower roller bearings 86 each abut the bottommost surface of an adjacent cam 50. The actuator 12 is further configured and mounted to the hinge clevis 26 so that the gap 80 located above the sleeve 44, and gap 90 located below the sleeve, are of identical length.

In the depicted embodiment of the invention, the clevis 26 to which the actuator 12 is mounted has a plate 96 that is fixed to a portion of the aircraft fuselage 18 adjacent the door opening 16. A pair of upper and lower clevis flanges, 98 and 99 respectively, that are spaced apart from each other extend laterally outward from the plate 96. The clevis flanges 98 and 99 are each formed with an opening 100 through which the piston rod 42 travels and the splined shaft 44 rotates.

The first pair of cams 50 are seated on the upper clevis flange 98. The cams 50 are formed as a single component and are integrally connected to each other by a base member 102 in the form of an annular ring that is seated in the adjacent clevis flange opening 100. Each cam 50 is formed with an outer surface 104 on which the roller bearings 86 travel that has a helical profile and that extends 180° around the adjacent splined sleeve 44. The cams 50 are arranged so that the individual outer surfaces 104 are reverse symmetric with respect to each other around the center axis of the actuator 12. The second pair of cams 52 are an inverted version of the first pair of cams 50. The second pair of cams 52 have an annular base member 106 disposed inside the lower clevis flange opening 101. The second pair of cams 52 are directed towards the piston housing 38 and each has a helical outer surface 108 that extends 180° around the splined sleeve 44. Cams 52 are arranged so that the outer surfaces 108 are reverse symmetric with respect to each other about the center axis of the actuator 12. The pairs of cams 50 and 52 are arranged so that the first cam outer surfaces 104 are symmetric to the second cam outer surfaces 108 around a line perpendicular to the axis of the actuator 12 and between the cams.

A first bushing 110 is disposed between the first cam base member 102 and the adjacent upper clevis flange 98 in the opening 100. The bushing 110 has an outer annular lip 112 that rests on the upper clevis flange 98 over the cams 50. A second bushing 110 is disposed between the second cam base member 106 and the lower clevis flange 99 in the opening 101. The lip 112 of the second bushing 110 is positioned between the second cams 52 and the lower clevis flange 99. The cams 50 and 52 are secured to the clevis 26 by a bolt 114 that extends through tabs 116 and 117 that respectively extend outwards from the cam base members 102 and 106. The bolt 114 extends through openings 118 formed in the tabs 116 and 117 and openings 119 formed in the hinge clevis flanges 98 and 99. A nut 120 is secured to the free end of the bolt adjacent the clevis lower flange 99.

Separate bearing assemblies 76 interconnect each cam base member 102 and 106 with the splined sleeve 44. Each bearing assembly 76 includes an inner race 128 that is fitted around the sleeve 44. The inside wall of the inner race 128 is compressed fitted to the sleeve outer surface 45 so that the inner race will normally rotate with the sleeve 44. Each bearing assembly includes an outer race 132 that is compression fitted in an adjacent stepped indention 134 formed around the inside of the adjacent cam base member 102 or 106. The outside surface of the inner race 128 and the inner surface of the outer race 132 are formed with complementary concave indentations, not shown, so that bearings 138 can be seated therebetween. The bearings provide a lowfriction interconnection between the races 128 and 132 so that splined shaft 44 can freely rotate relative to the cams 50 and 52 and the hinge clevis 26.

The hinge arm lug 54 is located between the hinge clevis flanges 98 and 99 so that it abuts both bearing assemblies 76. The hinge arm lug 54 is formed with an opening 158 in which the piston rod 42 and the splined sleeve 44 are disposed. The inside surface of the hinge arm lug 54 that defines the opening 158 is formed with lateral ridges 160 so that the lug is interlocked with the sleeve outer surface 45 so that when the sleeve 44 rotates, the hinge 24 will pivot about the hinge clevis 26 in a plane perpendicular to the longitudinal axis of the sleeve.

The gas tank 56, which contains the pneumatic gas for driving the piston 42, is secured to the inside surface of the hinge 24 by a bracket 162. In a preferred embodiment of the invention, dry nitrogen serves as the pneumatic gas. In this embodiment of the invention, the gas tank is configured to hold approximately 30 cubic inches of dry nitrogen at approximately 3,000 psi which is the quantity of gas needed, with reserve capacity, to drive the piston 40 completely downward with the required force. Integral with the valve 60 is a release mechanism (not shown) that opens the valve under select circumstances. In most environments in which it is anticipated that the actuator 12 of this invention will be used, the release mechanism will open the valve 60 when the release mechanism is armed, and after the lift latch mechanism 32 has moved the door 14 so that the door stops 20 have cleared the fuselage stops 22.

The arming of the release mechanism is controlled by an arming lever 164 (FIG. 1) secured to the inside of the aircraft door 14. The arming lever 164 is mechanically or electrically connected to the valve release mechanism, to mechanically set the armed/disarmed state of the valve release mechanism. The arming lever 164 also controls the deployment of the escape chute. Typically, when the arming lever 164 is placed in the armed state, a member (not shown) attached to the bustle 30 is locked to the floor. When the actuator 12 opens the door the bustle is opened so as to allow the escape chute contained therein to inflate. Flight attendants or flight crew members arm the valve release mechanism by setting the lever 164 prior to the aircraft taking off; the release mechanism is disarmed prior to the normal departure of persons from the aircraft by returning the lever 164 to its original position.

During normal use of the door assembly 10, the actuator 12 of this invention is disarmed and the actuation of the lift latch mechanism 32 does not activate this actuator. The lift latch mechanism can thus be used to open and close the door 14 in a conventional manner. When the door 14 is opened and closed, the splined sleeve 44 will freely rotate as if a passive hinge pin so that the hinge assembly 24 can freely pivot about the hinge clevises 25 and 26. During the opening of the door 14, the first cam follower 46 may travel downwards along the cams 50. When the door 14 is closed, first cam follower 46 will be rotated upwards to its initial position.

Between the time the aircraft takes off and is prepared for normal exit of passengers, the arming lever 164 is set so as to arm the actuator 12 of this invention. In the event that a rapid evacuation of the aircraft is required, the first person reaching the door assembly 10 merely has to rotate the lift latch mechanism lever 34 so that the door stops 20 are clear of the fuselage stops 22. Once the lift latch mechanism lever 34 is urged beyond this point, the valve release mechanism causes valve 60 to open so as to trigger activation of this actuator 12. The opening of the valve 60 causes a gas to flow from the tank 56 into the housing cavity 64 above the piston 40. The gas urges the piston and associated piston rod 42 downwards. Owing to the equal and opposite reaction of forces, the nut 81 and washer 82 on the free end of the piston rod 42 and the piston housing 38 are simultaneously forced towards the opposed ends of the splined sleeve 44. This movement results in the first cam follower 46 being urged against the first pair of cams 50 and the second follower 48 being urged against the second pair of cams 52. The cam follower roller bearings 86 are forced to travel along the outer surfaces 104 and 108 of the cams 50 and 52 respectively. This movement forces the cam followers 46 and 48 to rotate so as to simultaneously rotate the splined sleeve 44. Since the hinge arm lug 54 is fastened for rotation to the sleeve 44, it similarly is rotated so as to in turn cause the hinge 24 to pivot outward relative to the hinge clevises 25 and 26 in a plane perpendicular to the longitudinal axis of the sleeve. The movement of the hinge 24 rapidly forces the door 14 away from the door opening 16. The rapid movement of the door 14 further serves to open the bustle 30 so as to allow escape chute to be de deployed so that the aircraft can be quickly evacuated.

When the door actuator 12 of this invention is triggered, the downward motion of the piston rod 42 causes the cam followers 46 and 48 to symmetrically impose compression forces about the cams 50 and 52 and the clevis elements to which they are attached. Since these forces are symmetrically imposed upon the cams 50 and 52 and the clevis flanges 98 and 99, these forces cancel each other out and do not impose any significant strain upon the fuselage structures to which the actuator 12 is attached. Similarly, the downward movement of the piston 40 does not impose any asymmetric or lateral strain on the piston housing 38. Thus, the actuator 12 of this invention can be readily attached to an aircraft door assembly 10 without having to provide any special reinforcing brackets.

Moreover, the splined sleeve 44 serves both as a regular hinge pin that connects the hinge assembly 24 to the fuselage clevis 26 and as a driving element that pivots the hinge so that the door 14 is forced open. There is no intermediate linkage required to connect either the piston 40 or the piston rod 42 to the hinge assembly in order to pivot the door 14 open. The overall assembly of the actuator 12 of this invention thus occupies a relatively small amount of space. These features make it possible to install the actuator 12 of this invention in aircraft with both minimum relative cost and expense.

Another advantage of the actuator 12 of this invention is that the angular force exerted on a hinge 24 can be readily varied by changing the helical slope of of the outer surfaces 104 and 108 of the cams 50 and 52. As a result, it is a relatively simple matter to use a single version of the actuator 12 of this invention on a number of different door assemblies by merely varying the cams that are used with the assemblies in order to adjust for the differences in angular force needed to actuate different doors. Moreover, in some embodiments of the invention, it may be desirable to shape the cams so that the actuator initially provides a large torque for opening the door and deploying the escape chute, and then a reduced torque for continuing the movement of the door. In these embodiments of the invention, the cam outer surfaces 108 may be formed so that each surface has two or more sections formed with different angles of inclination relative to the center of the actuator 12.

Figure 4:
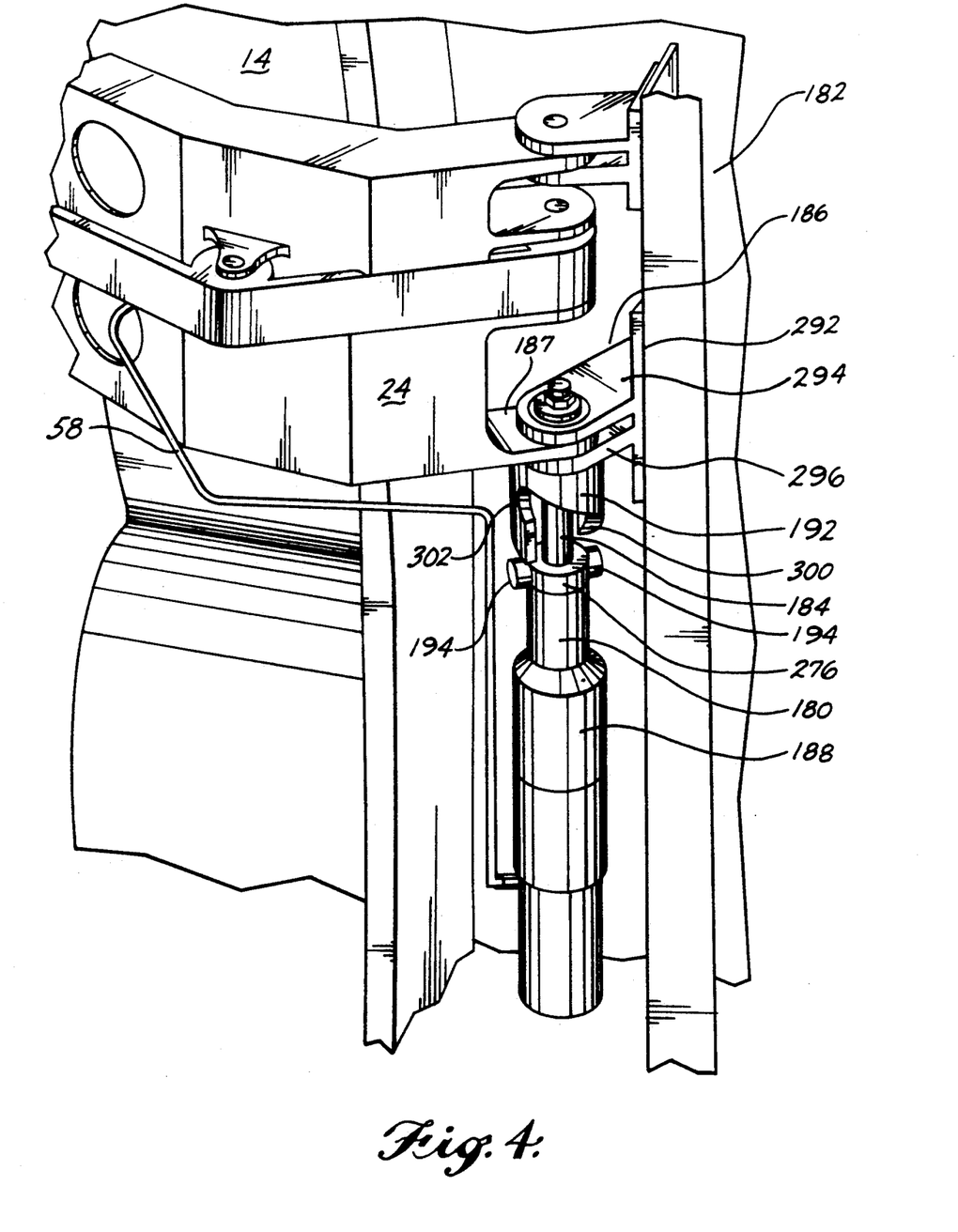
FIG. 4 is a perspective view illustrating the aircraft door assembly wherein an alternative embodiment of the cam-driven actuator of this invention is employed.
Figure 5:
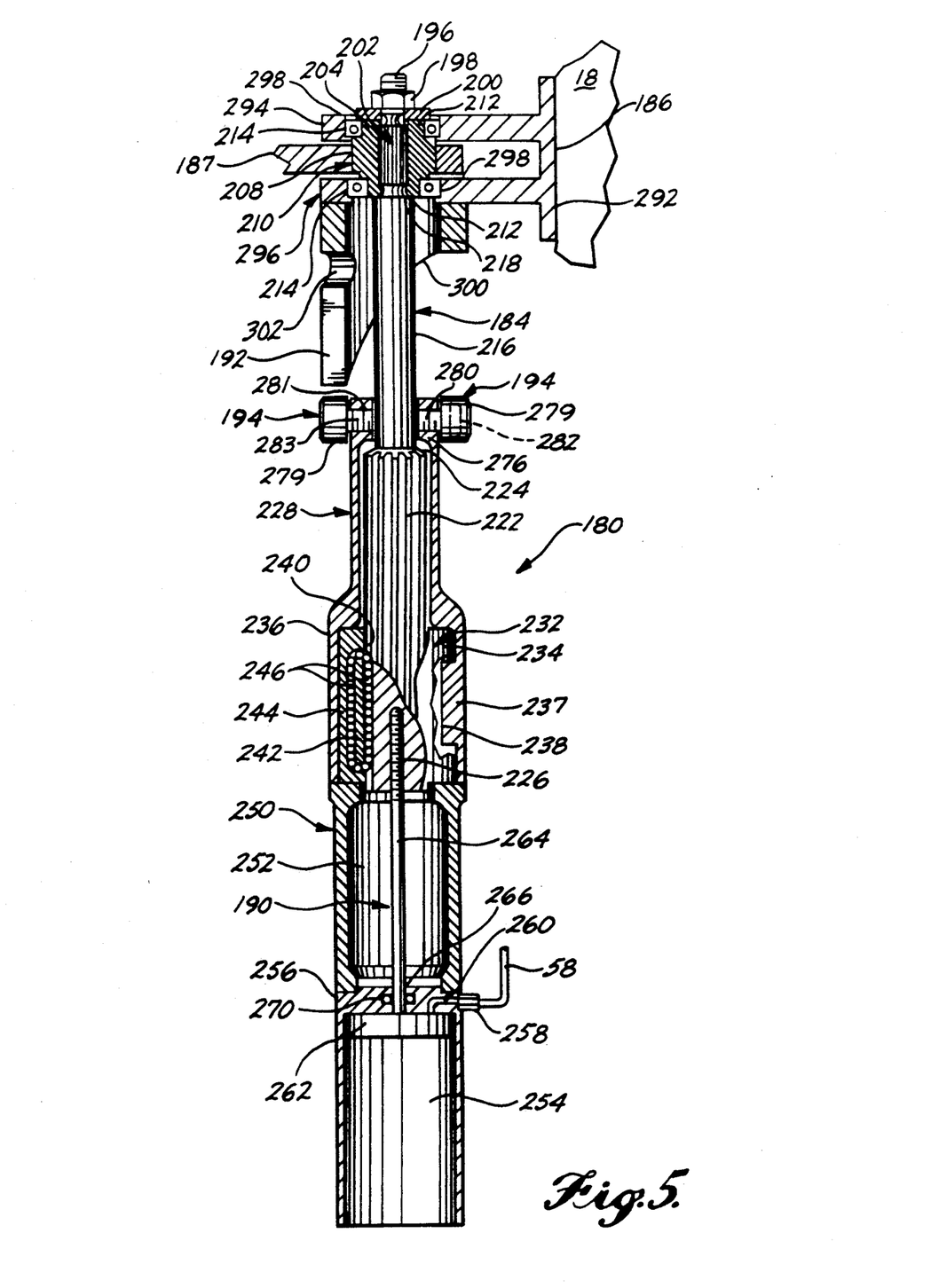
FIG. 5 is a front and partial cross-sectional view taken illustrating the alternative cam-driven actuator of FIG. 4.

FIGS. 4 and 5 depict an alternative door actuator 180 of this invention attached to an aircraft door assembly 182. The actuator 180 includes a torsion shaft 184 that is suspended from a hinge clevis 186 to which a hinge arm lug 187 of the door assembly 182 is attached. The lower half of the torsion shaft is normally disposed in a housing 188. A piston 190 extends downwards from the torsion shaft 184 and is disposed entirely in the housing 188. A pair of reverse symmetrically oriented cams 192 are attached to the hinge clevis 186 adjacent the actuator 180. The head of the housing 188 is provided with a pair of cam followers 194 each of which is positioned to abut one of the cams 192. The actuator 180 is driven by pneumatic gas stored in a gas tank 56 (FIG. 2) that is supplied to the actuator through a line 58 connected to the housing 188.

The torsion shaft 184 has a threaded head 196 to which a nut 198 and a washer 200 are attached for securing the shaft to the hinge clevis 186. Immediately below the shaft head 196 is a first splined section 202 to which a complementary shaft collar 204 is attached. The collar 204 has an inner splined surface, not shown, that is located around the first splined section 202 that is complementary therewith so that the collar will rotate with the shaft. The collar 204 has a midsection 208 with a pronounced diameter that is fitted in an opening 210 formed in the hinge arm lug 187. The collar 204 is attached to the hinge arm lug 187 with either fasteners or by complementary splined surfaces so that the collar and hinge arm lug will move in unison. The collar 204 is provided with a pair of opposed end sections 212 on either side of the midsections 208 which have a smaller diameter than the midsection. A bearing assembly 214 is fitted around each end section to hold the torsion shaft 184 to the hinged clevis 186. In the illustrated version of the invention, the washer 200 secured to the head 196 of the torsion shaft 184 is disposed over the collar 204 and part of the adjacent bearing assembly 214 so as to hold the torsion shaft in place.

The torsion shaft 184 has an intermediate section 216 located below the first splined section 202. In the depicted embodiment of the invention, the shaft intermediate section 216 is slightly greater in diameter than the first splined section 202. The adjacent end section 212 of the shaft collar 204 rests on the annular step 218 defined by the shaft first splined section 202-intermediate section 216 interface. A shaft second splined section 222 extends downward from the intermediate section 216. The shaft second splined section has a diameter that is greater than that of the intermediate section 216. A smaller annular taper section 224 extends between the intermediate and second splined sections 216 and 222 respectively. An axially extending bore 226 is formed in the base, or end section of the shaft second splined section 222.

The housing 188 is in general form of a cylindrical tube, one end of which is disposed over the torsion shaft second splined section 222, the other end of which is open. The housing has a first, or upper section 228 in which the torsion shaft second splined section 222 is normally disposed. The housing first section 228 is slightly spaced from the shaft second splined section 222 so that the torsion shaft 184 will not interfere with the longitudinal movement of the housing 188.

A ball spline assembly 232 is disposed inside the housing first section 228 for coupling the torsion shaft 184 to the housing 188 so that the housing can move longitudinally along the shaft and the shaft and housing will rotate in unison. The ball spline assembly 232 includes a cylindrical collar 234 that is normally disposed around the lower end of the torsion shaft second spline section 222. The ball spline assembly collar 234 is seated in an extended section 236 of the housing first section 228 that has a diameter slightly greater than that of the rest of the first section. The housing 188 is formed with an inwardly elongated tab 237 that extends into a complementary notch 238 formed in the outside of the ball spline assembly collar 234. The tab 237 serves to secure the ball spline assembly collar 234 to the housing 188 so that the housing and the ball spline assembly will rotate together. The ball spline collar 234 is dimensioned to have an inside surface 240 that is slightly spaced from the adjacent splined section 222 of the torsion shaft 184. The ball spline collar 234 is formed with a number of grooves 242 each of which is paired with a channel 244 so as to form a closed track for a number of ball bearings 246. Each groove 242 is formed in the inside surface 240 of the collar 234 and extends longitudinally along the inside surface. The ends of the grooves 242 are inwardly spaced from the ends of the collar. The channels 244 are formed in the collar 234 and each channel has approximately a flattened U-shaped profile. The ends of each channel 244 open into the opposed ends of the groove with which the channel is associated. The bearings 246 are dimensioned so that when they are traveling in the grooves 242, at least a portion of each bearing is further disposed in one of the spaces defined by the torsion shaft second splined section 222. Each groove 242-and-channel 244 track is essentially packed with bearings 246.

The actuator housing 188 has a second or lower section 250 that extends from the first section 228 in which the piston 190 is disposed. The outer surface of the actuator housing lower section 250 has approximately the same diameter as the first section extended section 236. The housing second section 250 defines a rod space 252 and a lower piston space 254 that are separated by a circular plate 256 that is integral with the housing 188. A gas inlet port 258 is fitted to the outside of the housing adjacent the plate 256. The plate 256 is formed with a channel 260 that extends between the gas inlet port 258 and the piston space 254.

The piston 190 includes a piston head 262 to which a piston rod 264 is integrally attached. The piston head 262 is disposed inside the housing piston space 254 and is constructed so that there is a gas-tight interface between the piston and the adjacent inner wall of the housing. The piston rod 264 extends through an opening 266 formed in the housing plate 256, through the 252 shaft space and is attached to the torsion shaft 184. The free end of the piston rod 264 is secured to the torsion shaft bore 226. In the illustrated embodiment of the invention, the outside of the piston rod 264 and the adjacent portion of the torsion shaft 184 that defines the bore 226 are formed with complementary threading so that the piston 190 can be secured in place. The actuator 180 is configured so that the piston head 262 is normally disposed against the housing plate 256. A seal 270 is seated in the housing plate 256 adjacent the opening 266. The seal 270, which is disposed around the piston rod 264, provides a gas-tight barrier between the piston space 254 and the rod space 252.

The cam followers 194 are attached to a collar 276 that is attached to the top of the actuation housing 188 and extends around the torsion shaft 184. The collar 276 may be formed as an integral part of the housing 188. Alternatively, the collar 276 may be a separate component that is secured to the housing 188. Each cam follower 194 comprises a roller 279 with an integrally attached stud 280 that is fitted in an opening 281 formed in the collar. The end of the studs 280 and the opening 281 are formed with complementary threads 283 so the cam followers 194 can be secured to the collar 276. Bearing races 282, one shown in phantom, between the rollers 279 and associated studs 280 allow the rollers to freely turn.

The hinge clevis 186 is substantially identical to the hinge clevis 26 described with respect to the first embodiment of the invention (FIG. 2). The hinge clevis 186 includes a plate 292 attached to the aircraft fuselage 18. A pair of spaced apart upper and lower clevis flanges, 294 and 296, respectively, extend outwards from the clevis plate 292. The clevis flanges 294 and 296 are formed with coaxial openings 298 in which the torsion shaft 184 is fitted. Specifically, the torsion shaft collar 204 is secured to the clevis 186. The collar end sections 212 are each disposed in a separate clevis flange opening 298. The bearing assemblies 214 which are similar in construction to the previously disclosed bearing assemblies 76 (FIG. 4), are disposed in the clevis flange opening 298 around the collar end sections 212 so as to rotatably secure the collar in place. The hinge arm lug 187, which is fixed to the collar midsection 208, is located between the clevis flanges 294 and 296.

In the depicted embodiment of the actuator 180, the cams 192 integrally form part of the lower hinge clevis flange 296. Each cam 192 has an outer surface 300 with an outer surface helical profile extends 180° around the torsion shaft intermediate section 216. The cams 192 are arranged so that the outer surfaces 300 are reverse symmetric with respect to each other and so that when the actuator 180 is triggered the cam followers 194 will travel along the opposed outer surfaces. In this embodiment of the invention, the cams 192 are approximately three inches in length. Each cam 192 is further formed with a semicircular notch 302 adjacent the lower hinge clevis flange 296 and opposite the outer surface 300 of the opposed cam. When the actuator 180 is activated, the notches 302 provide a final stopping space for the cam follower rollers 279. In the described embodiment of the invention, the cams 192 are depicted as being integral with the adjacent hinge clevis lower flange 296. It is, of course, understood that in alternative embodiments of the invention cams 192 may be separate components that are securely affixed to the clevis 186.

Pneumatic gas for driving the actuator 180 is supplied through gas line 58 in a manner previously described with respect to the first embodiment of the invention. Pneumatic gas is allowed to flow into the actuator 180 in response to the same triggering event described with respect to the first embodiment of the invention; movement of the lift latch mechanism lever 34 beyond a certain point when the valve release mechanism 60 is in the armed state (FIGS. 1 and 2).

During the normal opening and closing of the door assembly 182, the torsion shaft 184 serves as a passive hinge pin. Whenever the door 14 is opened or closed, the hinge 24 pivots about the hinge clevis 186. Since the torsion shaft 184 is securely attached to the hinge arm lug 187 via the collar 204, the torsion shaft rotates in conjunction with the movement of the hinge 24. Since the ball spline assembly 232 couples the torsion shaft 184 and the actuator housing 188 together for rotation, rotational movement of the torsion shaft causes like movement in the actuator housing.

When the actuator assembly 180 of this embodiment of the invention is activated, gas control valve 60 is opened so as to cause pneumatic gas to flow through the gas line 58 and gas inlet port 258 into the channel 260 that opens into the actuator housing piston space 254 immediately above the piston head 262. Since the torsion shaft 184-piston 190 sub-assembly is restricted from longitudinal movement, the gas forces the circular plate 256 and the rest of the actuator housing 188 upwards relative to the torsion shaft and the piston. This movement forces the cam followers 194 against the outer surfaces 300 of the associated cams 192. The continued upward movement of the actuator housing 188 forces the cam followers 194 to rotate along the outer surfaces 300 of the cams 192. Since the cam followers 194 are firmly attached to the actuator housing 188, the housing 188 is forced to similarly rotate as it moves upward. During this upward movement, the ball spline bearings 246 travel freely in the tracks formed by the groove 242-and-channel 244 pairs so as to provide a low friction interface between the housing and the torsion shaft 184.

The ball spline bearings 246 also serve to transfer the rotational movement of the actuator housing 188 to the torsion shaft 184 so that the torsion shaft rotates with the housing. Since the hinge arm lug 187 is secured to the torsion shaft 184, this movement causes the hinge assembly 24 to pivot about the hinge clevis 186 so as to rapidly push the door 14 away from the door opening 16.

The ball spline assembly 232 of this embodiment of the invention offers a relatively low friction interface between the torsion shaft 184 and the actuator housing 188. Thus, it is possible to activate the actuator assembly 180 of this embodiment of the invention a number of times without significantly increasing the amount of wear on its various components. This serves to increase the overall lifetime of the actuator since there are many situations where it is desirable to frequently activate the actuator as part of the safety testing processes in order to insure that it functions properly. Since the actuator 180 can be frequently activated without imposing much wear on the components, this type of testing does not significantly depreciate the lifetime of the assembly of this embodiment of the invention.

Furthermore there is significantly less sliding friction associated with the ball spline assembly 232 than with a conventional spline joints. As a result only a relatively small amount of force needs to be applied to the actuator housing 188 in order cause the desired upward movement. Consequently, both the amount of gas that needs to be supplied to the actuator 180 and the size of the actuator can be kept at a minimum.

Moreover, it is not necessary to provide the door assemblies 182 with which this embodiment of the actuation 180 is used with a set of upper cams. Thus, other components of the aircraft can be fitted into the space that would be otherwise occupied by the upper cams.

The above detailed description has been limited to specific embodiments of the invention. It will be apparent, however, that variations and modifications can be made to this invention with the attainment of some or all of the advantages thereof. For example, there is no requirement that only paired cams be employed as part of an actuator assembly of this invention. In some embodiments of the invention, it may be desirable to provide a single cam. In still other embodiments of the invention, it may be desirable to provide each cam sub-assembly with three or more cams. Furthermore, even when the actuator is provided with paired cams, there is no requirement that the cams always be formed with outer surfaces that extend 180° about the associated actuator element. It should further be understood that the actual path of the cam followers will usually be less than the arcuate range of the associated cams. This is because the cam followers usually do not travel from end-to-end over the associated cam surfaces; the followers usually start their travel inside of the free end of the associated cam surface and are blocked from moving to the opposed end by part of the cam follower structure.

Moreover, in the depicted embodiments of the invention, the actuator of this invention is shown as being mounted to the lower of two hinge clevises and the piston housing of the actuator is shown as being below the hinge clevis. It should similarly be understood that these depictions are merely meant to be illustrative and not limiting. In other embodiments of the invention, it may be desirable to mount the actuator of this invention so that the piston rod serves as a hinge pin for a top-located hinge clevis and/or so that the piston housing of the actuator is located above the clevis with which it is associated. Furthermore in some versions of this invention the splined sleeve 44 that is disposed over the piston rod 42 may be eliminated; in these embodiments of the invention the cam followers 46 and 48 may be directly connected to the piston rod.

In still other embodiments of the invention, it may be desirable to provide a cam rod assembly that does not rotate, and to provide a cam assembly that does rotate. In these versions of the invention, it may be desirable to provide a hinge arm lug that rotates freely relative to the piston rod and to integrally attach cam members to the hinge arm lug. In these embodiments of the invention, cam elements would be integrally attached to the hinge arm lug. When the actuator of this embodiment of the invention is triggered, the cam followers would be forced against the cams. This force, in turn, would cause the hinge arm lug to rotate about the piston rod so that the hinge arm is pivoted about the fuselage frame and the door is moved free of the aircraft. In a similar vein, other means can be used to force the movement of the piston rods rather than the disclosed pneumatic gas. Therefore, it is the object of the appended claims to cover all such variations and modifications as come within the true spirit and scope of the invention.

The embodiments of the invention in which an exclusive property or privilege is claimed are defined as follows:

1. A hinge assembly for coupling a door to a frame member comprising:
   a hinge clevis attached to the frame member;
   a hinge attached to the door, said hinge including a hinge pin having a longitudinal axis rotatably fitted to said hinge clevis so that said hinge can pivot relative to said hinge clevis;
   a cam assembly including a first cam member securely attached to said hinge clevis adjacent said hinge pin, a second cam member mounted to said hinge pin adjacent said first cam member wherein said second cam member is fixedly mounted to said hinge pin to rotate in unison with said hinge pin and adjustably fitted to said hinge pin to move longitudinally along said hinge pin against said first cam member and said first and second cam members are shaped so that, when said cam members are urged together, said second cam member is rotated relative to said first cam member; and
   a selectively triggerable actuator for longitudinally displacing said second cam member against said first cam member so as to cause rotation of said second cam member about said first cam member so that said hinge is pivoted about said hinge clevis.

2. The hinge assembly of claim 1, wherein said hinge pivots in a plane perpendicular to said hinge pin longitudinal axis.

3. The hinge assembly of claim 1, wherein said first cam member includes at least one cam attached to said hinge clevis, said second cam member includes at least one cam follower, and wherein said at least one cam has an outer surface shaped so that, when said at least one cam follower abuts said cam outer surface, said at least one cam follower moves in a circular path.

4. The hinge assembly of claim 3, wherein said hinge pivots in a plane perpendicular to said hinge pin longitudinal axis.

5. The hinge assembly of claim 1, wherein said actuator is a piston assembly having a movable piston disposed in a static housing and said piston is coupled to said second cam member for displacing said second cam member toward said first cam member.

6. The hinge assembly of claim 5, wherein:
   said hinge pin comprises a tubular sleeve connected to said hinge so as to rotate in unison therewith and said second cam member is coupled to said sleeve so as to rotate in unison therewith and to move longitudinally along said sleeve; and
   said piston assembly includes a piston rod extending from said piston out of said piston housing, said piston rod extends through said sleeve so as to have a free end projecting out of said sleeve opposite said piston housing, and said piston rod free end is connected to said second cam member for urging said second cam member against said first cam member.

7. The hinge assembly of claim 6, wherein said first cam member includes at least one cam attached to said hinge clevis, said second cam member includes at least one cam follower, and said at least one cam has an outer surface shaped so that, when said at least one cam follower abuts said cam outer surface, said at least one cam follower moves in a circular path.

8. The hinge assembly of claim 7, wherein said first cam member further includes a pair of cams attached to said hinge clevis and said second cam member includes two cam followers, said cams each having an outer surface against which a separate one of said cam followers abuts and said cam outer surfaces are arranged so that said cam followers move in a circular path.

9. The hinge assembly of claim 7, wherein:
   said first cam member further includes a second cam attached to said hinge clevis at a location longitudinally distal from said first cam;
   said second cam member further includes a second cam follower attached to said sleeve to move longitudinally along said sleeve and to rotate in unison with said sleeve positioned to normally be adjacent and longitudinally spaced from said second cam and further located adjacent said piston housing and in mechanical connection therewith; and
   said sleeve has a length less than that of said piston rod so that, when said piston is retracted, said second cam follower is urged against said second cam.

10. The hinge assembly of claim 6, wherein said sleeve is vertically oriented so as to have a top end and a bottom end and said piston housing is located below said sleeve bottom end and said piston rod free end is coupled to said sleeve top end so as to suspend said piston assembly from said sleeve.

11. The hinge assembly of claim 2, wherein said actuator is a piston assembly having a movable piston disposed in a static housing and said piston is coupled to said second cam member for urging said second cam member toward said first cam member.

12. The hinge assembly of claim 11, wherein said first cam member comprises two longitudinally spaced-apart cam elements, each cam element including at least two cam outer surfaces; said second cam member comprises two longitudinally spaced-apart cam followers, each said cam follower being spaced from a separate one of said cam elements and having a plurality of bearings, each said cam follower being located adjacent a separate one of said cam element outer surfaces; said cam element outer surfaces are shaped so that, when said cam follower bearings are urged against said outer surfaces, said cam follower bearings move in a circular path; and said cam followers are mounted to said piston assembly so that, when said piston rod is retracted, both said cam followers are urged against said cam elements adjacent thereto.

13. The hinge assembly of claim 5, further including a container in which a pneumatic fluid is stored, a line connected between said container and said piston housing and a valve for controlling pneumatic fluid flow from said container through said line wherein said line is connected to said piston housing so that, when said valve is open, said piston is retracted into said piston housing.

14. The hinge assembly of claim 1, wherein said actuator comprises a piston assembly including a piston having a piston rod that is securely attached to said hinge and rotatably attached to said hinge clevis so as to function as said hinge pin, and a piston housing disposed over said piston from which said piston rod extends, said piston housing being normally adjacent and longitudinally spaced from said first cam member; said second cam member is attached to said piston housing, and said piston rod and said piston housing are coupled so as to rotate in unison so that said piston housing can longitudinally shift position toward said first cam member.

15. The hinge assembly of claim 14, wherein said hinge pivots in a plane perpendicular to said hinge pin longitudinal axis.

16. The hinge assembly of claim 14, wherein said piston housing is coupled to said piston rod for rotational movement in unison therewith and longitudinal movement relative thereto by a ball spline assembly.

17. The hinge assembly of claim 14, wherein said first cam member includes at least one cam attached to said hinge clevis, said second cam member includes at least one cam follower, and said at least one cam has an outer surface shaped so that, when said at least one cam follower abuts said cam outer surface, said at least one cam follower moves in a circular path.

18. The hinge assembly of claim 17, wherein said first cam member further includes a pair of cams attached to said hinge clevis and said second cam member includes two cam followers, said cams each having an outer surface against which a separate one of said cam followers abuts and said cam outer surfaces are arranged so that said cam followers move in a circular path.

19. The hinge assembly of claim 17, wherein said hinge pivots in a plane perpendicular to said hinge pin longitudinal axis.

20. The hinge assembly of claim 17, wherein said piston housing is coupled to said piston rod for rotational movement in unison therewith and longitudinal movement relative thereto by a ball spline assembly.

21. The hinge assembly of claim 14, wherein said piston assembly is vertically oriented and is located below said hinge clevis and said piston rod has a free end coupled to said hinge clevis so as to suspend said piston housing from said hinge clevis.

22. The hinge assembly of claim 1, wherein said actuator is suspended from said hinge clevis.

* * * * *

UNITED STATES PATENT AND TRADEMARK OFFICE
CERTIFICATE OF CORRECTION

PATENT NO. : 5,180,121
DATED : January 19, 1993
INVENTOR(S) : E.D. Banks et al.

It is certified that error appears in the above-identified patent and that said Letters Patent is hereby corrected as shown below:

| COLUMN | LINE | |
|---|---|---|
| 3 | 5 | after "that" insert --the-- |
| 4 | 23 | "follower 48" should be --follower 46-- |
| 5 | 20 | delete "by" (second occurrence) |
| 6 | 44 and 45 | "lowfric-tion" should be --low-friction-- |

Signed and Sealed this

Sixteenth Day of November, 1993

Attest:

BRUCE LEHMAN

*Attesting Officer*     *Commissioner of Patents and Trademarks*